US008665384B2

(12) United States Patent
Veerasamy

(10) Patent No.: US 8,665,384 B2
(45) Date of Patent: Mar. 4, 2014

(54) RUGGEDIZED SWITCHABLE GLAZING, AND/OR METHOD OF MAKING THE SAME

(75) Inventor: Vijayen S. Veerasamy, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 13/473,869

(22) Filed: May 17, 2012

(65) Prior Publication Data

US 2012/0293862 A1 Nov. 22, 2012

Related U.S. Application Data

(62) Division of application No. 11/987,005, filed on Nov. 26, 2007, now Pat. No. 8,199,264.

(51) Int. Cl.
| | |
|---|---|
| G02F 1/1335 | (2006.01) |
| G02B 27/00 | (2006.01) |
| C09K 19/00 | (2006.01) |
| B32B 17/06 | (2006.01) |

(52) U.S. Cl.
USPC ............. 349/16; 359/614; 428/1.62; 428/426

(58) Field of Classification Search
USPC .............. 349/16; 359/614; 428/1.6, 1.62, 426
See application file for complete search history.

(56) References Cited

U.S. PATENT DOCUMENTS

| | | | |
|---|---|---|---|
| 4,532,181 A | 7/1985 | Brill et al. | |
| 4,806,221 A | 2/1989 | Gillery | |
| 4,883,721 A | 11/1989 | Nalepka et al. | |
| 5,178,966 A | 1/1993 | Gillery | |
| 5,251,048 A | 10/1993 | Doane et al. | |
| 5,384,067 A | 1/1995 | Doane et al. | |
| 5,437,811 A | 8/1995 | Doane et al. | |
| 5,453,863 A | 9/1995 | West et al. | |
| 5,539,552 A | 7/1996 | Desai et al. | |
| 5,621,552 A | 4/1997 | Coates et al. | |
| 5,668,614 A | 9/1997 | Chien et al. | |
| 5,691,795 A | 11/1997 | Doane et al. | |
| 5,695,682 A | 12/1997 | Doane et al. | |
| 5,748,277 A | 5/1998 | Huang et al. | |
| 5,837,361 A | 11/1998 | Glaser et al. | |
| 5,847,798 A | 12/1998 | Yang et al. | |
| 5,877,826 A | 3/1999 | Yang et al. | |
| 5,886,763 A | 3/1999 | Wolkowicz et al. | |
| 6,030,671 A | 2/2000 | Yange et al. | |
| 6,055,088 A | 4/2000 | Fix et al. | |

(Continued)

OTHER PUBLICATIONS

U.S. Appl. No. 11/987,005, filed Nov. 26, 2007; Veerasamy PDLC Switchable Windows (1page).

(Continued)

*Primary Examiner* — Edward Glick
*Assistant Examiner* — Dennis Y Kim
(74) *Attorney, Agent, or Firm* — Nixon & Vanderhye P.C.

(57) ABSTRACT

A coated article includes a low-E coating supported by a substrate (e.g., glass substrate), the low-E coating including first and second IR reflecting layers comprising silver and/or gold, and at least one UV blocking layer that blocks significant amounts of UV light having a wavelength of from 380-400 nm so that no more than about 20% of light having a wavelength of from 380-400 passes through the low-E coating. The UV blocking layer may be positioned so as to not directly contact the first and second IR reflecting layers.

13 Claims, 6 Drawing Sheets

(56) References Cited

U.S. PATENT DOCUMENTS

| | | |
|---|---|---|
| 6,061,107 A | 5/2000 | Yang et al. |
| 6,104,448 A | 8/2000 | Doane et al. |
| 6,154,190 A | 11/2000 | Yang et al. |
| 6,204,835 B1 | 3/2001 | Yang et al. |
| 6,268,839 B1 | 7/2001 | Yang et al. |
| 6,320,563 B1 | 11/2001 | Yang et al. |
| 6,466,298 B1 | 10/2002 | Fix et al. |
| 6,576,349 B2 | 6/2003 | Lingle et al. |
| 6,596,399 B2 | 7/2003 | Veerasamy |
| 6,632,491 B1 * | 10/2003 | Thomsen et al. ............... 428/34 |
| 6,674,504 B1 | 1/2004 | Li et al. |
| 7,056,588 B2 | 6/2006 | Neuman et al. |
| 7,189,458 B2 | 3/2007 | Ferreira et al. |
| 7,198,851 B2 | 4/2007 | Lemmer et al. |
| 7,220,793 B2 | 5/2007 | Vanier et al. |
| 7,236,151 B2 | 6/2007 | Doane et al. |
| 7,479,940 B2 | 1/2009 | Marhefka |
| 7,744,951 B2 * | 6/2010 | Varaprasad .................... 427/162 |
| 8,025,941 B2 * | 9/2011 | Taylor et al. .................... 428/34 |
| 8,199,264 B2 | 6/2012 | Veerasamy |
| 2002/0041346 A1 | 4/2002 | Faris et al. |
| 2002/0068167 A1 * | 6/2002 | Veerasamy ................... 428/341 |
| 2002/0171788 A1 | 11/2002 | Lin et al. |
| 2003/0008182 A1 | 1/2003 | Saitoh et al. |
| 2003/0150711 A1 | 8/2003 | Laird |
| 2003/0165693 A1 * | 9/2003 | Hartig et al. .................. 428/426 |
| 2003/0224182 A1 | 12/2003 | Simpson et al. |
| 2004/0105614 A1 | 6/2004 | Kobayashi et al. |
| 2005/0136243 A1 | 6/2005 | Fisher |
| 2005/0164015 A1 | 7/2005 | Laird et al. |
| 2005/0270432 A1 | 12/2005 | Overline |
| 2006/0023146 A1 | 2/2006 | Yang et al. |
| 2006/0046072 A1 * | 3/2006 | Ferreira et al. ................ 428/432 |
| 2006/0121290 A1 * | 6/2006 | Chonlamaitri et al. ....... 428/428 |
| 2006/0246300 A1 | 11/2006 | Hevesi |
| 2009/0136765 A1 * | 5/2009 | Maschwitz et al. ........... 428/432 |

OTHER PUBLICATIONS

U.S. Appl. No. 11/979,635, filed Nov. 6, 2007; Veerasamy; Abandoned.

* cited by examiner

RUGGEDIZED SWITCHABLE GLAZING, AND/OR METHOD OF MAKING THE SAME

This application is a divisional of application Ser. No. 11/987,005 filed Nov. 26, 2007 now U.S. Pat. No. 8,199,264, the entire disclosure of which is hereby incorporated herein by reference in this application.

FIELD OF THE INVENTION

Certain example embodiments of this invention relate to ruggedized switchable glazings, and/or methods of making the same. More particularly, certain example embodiments relate to liquid crystal inclusive (e.g., PDLC) layers that are protected using, for example, low-E UV-blocking coatings, PVB and/or EVA laminates, and/or PET layers. Certain example embodiments advantageously reduce one or more problems associated with residual haze, color change, flicker, structural changes in the polymer and/or the LC (liquid crystal), degradations in state-switching response times, delamination, etc.

BACKGROUND AND SUMMARY OF EXAMPLE EMBODIMENTS OF THE INVENTION

Polymer dispersed liquid crystals (PDLCs) typically are made by inducing phase separation in an initially homogeneous mixture of liquid crystal and monomers. Preparation of PDLCs involves a phase separation, which is conventionally triggered by polymerization of the monomer matrix by either UV or thermal curing, or even rapid evaporation of solvents. As the monomer polymerizes, the liquid crystal phase separates into microscopic droplets or domains or pockets surrounded by the walls of the cured polymer matrix, which provides a "backbone" to hold the LC. The mixture of cured polymer and LC are held together between two sheets of polyethylene (PET), often coated with transparent conducting oxides (TCOs) through which an electric field is applied. When unaddressed (e.g., when no voltage is applied), the nematic texture within the domains is randomly oriented with respect to the other neighboring domains, and the display appears whitish caused by the scattering of light.

FIG. 1a is a conventional PDLC glass window 100 in an off state. Two glass substrates 102a, 102h are provided. A conductive coating 104 is applied to the inner surface of the outer substrate 102a (e.g., surface 2 of the window assembly). A plurality of liquid crystal (LC) droplets 108 are disposed within the polymer mixture 106. Because no voltage is provided, the droplets 108 are randomly oriented, and incident light I reflects off of them, causing the scattering of light in the directions shown by the dashed arrows.

In the addressed state, the nematic texture in different domains align with the electric field, thus allowing for a clear state. FIG. 1b is a conventional PDLC glass window 100 in an on state. FIG. 1b is similar to FIG. 1a, except that a voltage V is applied to the PDLC layer (e.g., to the conductive coating 104) via one or more bus bars (not shown). The voltage causes the liquid crystal droplets to align parallel to the electric field, allowing incident light I to pass through the window 100 in the clear state.

Popular uses of this technology include glass walls in offices, conference rooms, lobbies, store fronts, etc. Privacy glass sometimes is used by homeowners (e.g., in bathrooms, entryways, family rooms, bedrooms, skylights, etc.). The windows may be made to function on a standard voltage and may be connected to switches. Windows also may be connected to timers.

Unfortunately, although such techniques have represented an improvement in some windows, there still are certain drawbacks. Although the electric field dramatically reduces the scattering, there still exists scattering at the boundary of the liquid crystal and polymer, and scattering between neighboring drops. This contributes in part to a residual haze in the clear state. Another contribution to the residual haze in the clear state relates to the polyvinyl butyral (PVB) or ethylene-vinyl acetate (EVA) used to laminate the PDLC to the glass.

Furthermore, as another example drawback of current PDLC techniques, such windows suffer from UV and solar-induced degradation of the PDLC layer, ultimately causing color change and/or flicker. As used herein, "UV" refers to light having a wavelength less than or equal to about 400 nm. More particularly, long-term exposure of the cured and laminated PDLC to ambient UV light exacerbates the haze values and causes a "browning" of the LC (although such values are material dependent, after about 3,000 hours of UV exposure, generally $\Delta E^* > 2$, with $\Delta E^*$ being known as a value indicative of color and transmission change of light, where $\Delta E^* = \sqrt{((\Delta L^*)^2 + (\Delta a^*)^2 + (\Delta b^*)^2)}$, with $L^*$ corresponding to the "lightness" of the color, $a^*$ corresponding to the color's position between red and green, and $b^*$ corresponding to the color's position between blue and yellow). Even though the PVB layer cuts off about 99% of the UV radiation below about 380 nm, a large portion of UVA (e.g., having a penetration depth of long wavelength UVA in the order of magnitude of PVB thickness) may still cause structural changes in both the polymer as well as the LC, making determining the size of the droplets, and hence the scattering function, difficult and susceptible to change. As used herein, "UVA" refers to light having a wavelength from about 320 nm to about 400 nm. The UV also may degrade and/or fade the colored PVB layers. This susceptibility to degradation and/or fading is true for dye-based PVB, as well as in pigment-based PVB.

The degradation is exacerbated with temperature increases in the LCs. Because the thermal conductivity of the PVB, PET, and/or LC is low, radiation causes thermal runaways if samples are left exposed to the sun for relatively long periods of time.

Another degradation of PDLC performance relates to the switching times of the LC as its exposure to UV and heat increases. Response time essentially is a function of the sum of the time on and time off (Ton+Toff). Initially, the response time of the device is just under about 20 ms, which corresponds to a frequency of about 100 Hz. This frequency is well above 25 Hz, which is generally regarded as the frequency at which the human eye can perceive flicker. However, after about 1,000 hours of QUV accelerated weathering, the response time may climb above about 40 ms, which may make flicker noticeable to the human eye.

Still another set of problems relates to delamination. Currently, curved laminates with sharp edges are susceptible to delamination in and/or proximate to high-stress hot-spots.

Thus, it will be appreciated that there is a need in the art for coated articles that overcome one or more of these and/or other disadvantages. It also will be appreciated that there is a need in the art for improved PDLC techniques (for use in, for example, vehicle windows, insulating glass (IG) window units, etc.).

In certain example embodiments of this invention, there is provided a window (e.g., vehicle windshield, architectural window, or the like) comprising: an inner substrate and an outer substrate, the inner and outer substrates being substantially parallel to one another; a multi-layer low-E ultraviolet (UV) blocking coating supported by an inner surface of the outer substrate, the low-E UV blocking coating blocking significant amounts of UV in the range of from about 380-400 nm; a liquid crystal inclusive layer disposed between at least the inner and outer substrates; first and second substantially transparent conductive layers, the first and second substantially transparent conductive layers being provided between the liquid crystal inclusive layer and the outer and inner substrates, respectively; first and second polymer inclusive laminating layers, the first laminating layer provided between at least the liquid crystal inclusive layer and the outer substrate and the second laminating layer provided between at least the liquid crystal inclusive layer and the inner substrate; at least one bus bar in electrical communication with the first and/or second transparent conductive layer(s) so as to cause the liquid crystal inclusive layer to become activated when a voltage is applied thereto; and wherein the multi-layer low-E UV blocking coating comprises at least one IR reflecting layer and at least one UV blocking layer so that no more than about 20% of ambient light having a wavelength of from 380-400 nm reaches the liquid crystal inclusive layer, and wherein the coated article has a visible transmission of at least about 55% when the liquid crystal inclusive layer is activated.

In certain example embodiments of this invention, there is provided a coated article including a low-E coating supported by a substrate, the low-E coating comprising: first and second IR reflecting layers comprising silver and/or gold; at least one UV blocking layer that blocks significant amounts of UV light having a wavelength of from 380-400 mm so that no more than about 20% of light having a wavelength of from 380-400 passes through the low-E coating; and wherein the UV blocking layer is positioned so as to not directly contact the first and second IR reflecting layers. This coated article may be used in a window unit or the like in different example embodiments of this invention, and the substrate may be based on glass in certain example instances.

In certain example embodiments of this invention, a coated article and/or a method of making the same is/are provided. An inner substrate and an outer substrate are provided. The inner and outer substrates are substantially parallel to one another. A multi-layer low-E UV blocking coating is supported by an inner surface of the outer substrate. A liquid crystal inclusive layer is disposed between the inner and outer substrates. First and second transparent conductive layers are provided. The first and second transparent conductive layers are provided between the liquid crystal inclusive layer and the outer and inner substrates, respectively. First and second laminate layers are provided. The first laminate layer is for lamination to the outer substrate, and the second laminate layer is for lamination to the inner substrate. At least one bus bar is operably connected to the liquid crystal inclusive layer through the first and/or second transparent conductive layer (s) so as to cause the liquid crystal inclusive layer to become activated when a voltage is applied to the at least one bus bar. The multi-layer low-E UV blocking coating is arranged so that no more than about 20% of light having a wavelength of about 380-400 nm reaches the liquid crystal inclusive layer. The coated article has a visible transmission of from about 55-65% when the liquid crystal inclusive layer is activated.

In certain example embodiments of this invention, an insulating glass unit and/or a method of making the same is/are provided. Three substantially parallel substrates are provided. A multi-layer low-E UV blocking coating is supported by a surface of the second substrate facing the third substrate. A liquid crystal inclusive layer is disposed between the second and third substrates. First and second transparent conductive layers are provided. The first and second transparent conductive layers are provided between the liquid crystal inclusive layer and the second and third substrates, respectively. First and second laminate layers are provided. The first laminate layer is for lamination to the second substrate and the second laminate layer is for lamination to the third substrate. At least one bus bar is operably connected to the liquid crystal inclusive layer through the first and/or second transparent conductive layer(s) so as to cause the liquid crystal inclusive layer to become activated when a voltage is applied to the at least one bus bar. The first and second substrates are spaced apart. The multi-layer low-E UV blocking coating is arranged so that no more than about 20% of light having a wavelength of about 380-400 nm reaches the liquid crystal inclusive layer. The insulating glass unit has a visible transmission of from about 55-65% when the liquid crystal inclusive layer is activated.

In certain example embodiments of this invention, a coated article including a low-E UV blocking coating supported by a substrate and/or a method of making the same is/are provided. The low-E UV blocking coating comprises first and second IR reflecting layers comprising silver and/or gold, and a UV blocking layer that blocks light having a wavelength of about 380-400 nm so that no more than about 20% of such light penetrates the coating. The coated article has a visible transmission of at least about 55%.

In certain example embodiments of this invention, an insulating glass (IG) unit including a low-E UV blocking coating supported by a substrate and/or a method of making the same is/are provided. The low-E UV blocking coating comprises first and second IR reflecting layers comprising silver and/or gold, and a UV blocking layer that blocks light having a wavelength of about 380-400 nm so that no more than about 20% of such light penetrates the coating. The IG unit has a visible transmission of at least about 55%.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments provide PDLC windows using an effective blocking layer as well as a double or triple silver layer so as to reduce the incidence of the PDLC warming and therefore help to solve of one or more of the above-described and/or other problems associated with conventional PDLC techniques. The UV blocking layer preferably has at least about 99.5% UV cut-off below 410 nm. In certain example embodiments, the UV blocking layer is temperable. Certain example embodiments therefore may advantageously reduce one or more problems associated with residual haze, color change, flicker, structural changes in the polymer and/or the LC, degradations in state-switching response times, delamination, etc.

Figures 1A, 1B:
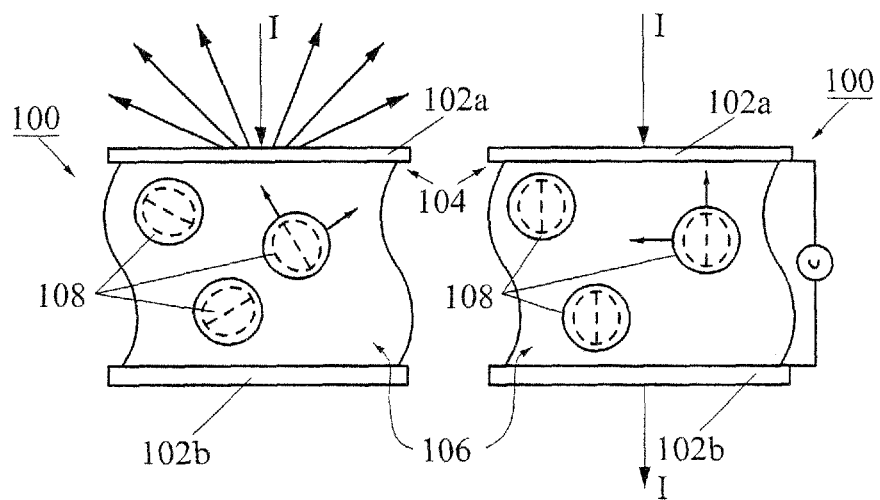
FIG. 1a is a conventional PDLC glass window in an off state.
FIG. 1b is a conventional PDLC glass window in an on state.
Figure 2:
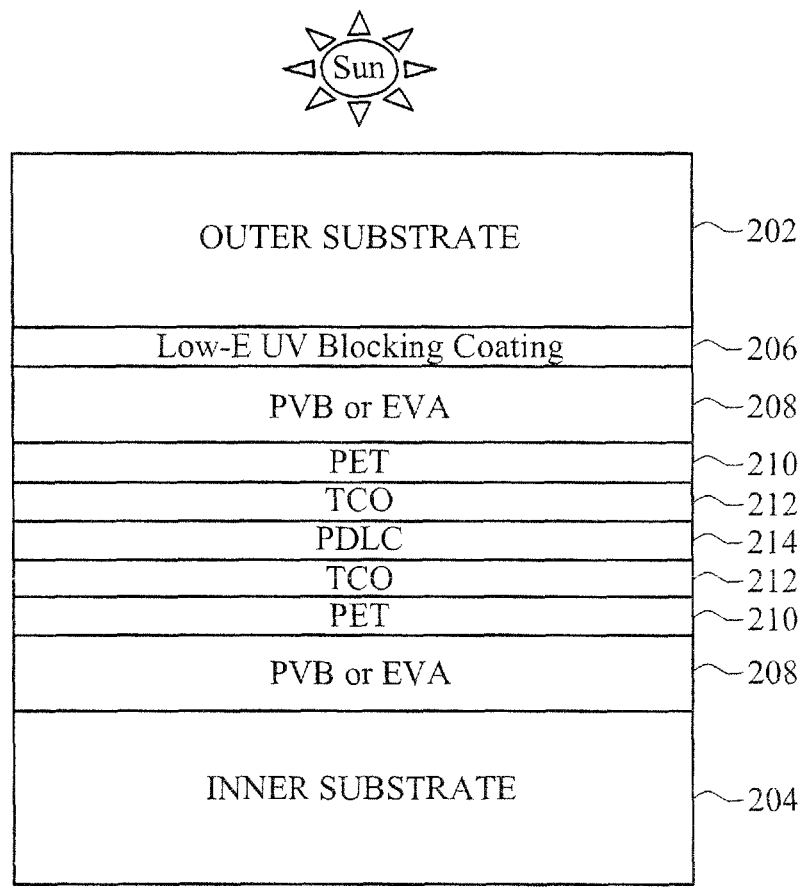
FIG. 2 is a cross-sectional view of a window in accordance with an example embodiment of this invention.

FIG. 2 is a cross-sectional view of a window in accordance with an example embodiment. In the window of FIG. 2, two substrates (e.g., glass substrates) are provided, including an outer substrate 202 and an inner substrate 204. A low-E UV blocker 206 is deposited on the inner surface of the outer substrate 202. The low-E coating 206 may be, for example, of the type disclosed in U.S. Pat. No. 7,056,588 or 6,887,575, or application Ser. No. 11/281,598, the entire contents of each of which is hereby incorporated herein by reference. The low-E coating 206 also may include one or more infrared reflecting (IR) layers in certain example embodiments. Furthermore, the low-E coating may include one or more UV blocking layers, or a separate UV blocking coating may be applied, e.g., proximate to one or more of the low-E coatings described above. Further details of an example low-E UV blocking layer are provided below, e.g., with reference to FIGS. 6 and 7.

A first laminate layer 208 comprising a polymer-based material (e.g., PVB and/or EVA) is applied over the low-E UV blocking coating 206 proximate to surface 2 of the window. A second laminate layer 208 also comprising a polymer-based material (e.g., PVB and/or EVA) is applied on the inner surface of the inner substrate 204 (on surface 3 of the window). The first and second laminate layers 208 may be applied to the respective surfaces, via rolling and cured via an autoclaving process, for example.

The liquid crystal inclusive (e.g., PDLC) layer 214 is disposed approximately in the center of the cross-sectional stack shown in FIG. 2. Sandwiching the PDLC 214 are first and second TCO layers 212. The first and second TCO layers 212 may be of, or include, for example, $ZnAlO_x$, $SnO_x{:}F$, $SnSbO_x$, or the like, in certain example embodiments. The TCO layers may be sputtered onto one or both surfaces of the PDLC 214 and/or the respective surfaces of the first and second polymer-based (e.g., PET) layers 210 that are more proximate to the PDLC 214.

First and second polymer-based layers 210 are provided between the first and second laminate layers 208 and the first and second TCO layers 212, respectively. The first and second polymer-based layers 210, the first and second laminate layers 208, and the low-E UV blocking coating 206 extend at least the width of the PDLC 214 so as to protect it.

One or more bus bars are provided, e.g., to provide voltage to the PDLC 214, either directly or indirectly. In certain example embodiments, two bus bars are respectively connected to the first and second TCO layers 212. A groove or channel is cut in each of the first and second laminate layers 208. In certain example embodiments, when viewed in cross section, the grooves may be substantially U-shaped, with the first groove being upwardly oriented and the second groove being downwardly oriented. Also, in certain example embodiments, the grooves may be disposed at opposing corners of the PDLC stack, e.g., such that the first groove is disposed in the upper left corner of the PDLC stack while the second groove is disposed in the lower right corner of the PDLC stack. Of course, it will be appreciated that the foregoing description is provided by way of example and without limitation and that other arrangements may be used in connection with certain other example embodiments (e.g., when only one bus bar is used, when differently shaped channels are formed, etc.).

Each groove may be formed by laser cutting (e.g., using a $CO_2$ laser), using a half-cutter, or via any suitable means. The groove is filled with a silver paste, and a flat wire ribbon is bonded thereto. Voltage may be provided through this ribbon so as to cause the PDLC 214 to become activated. The voltage may be connected to a switch (not shown) in certain example embodiments.

Figure 3:
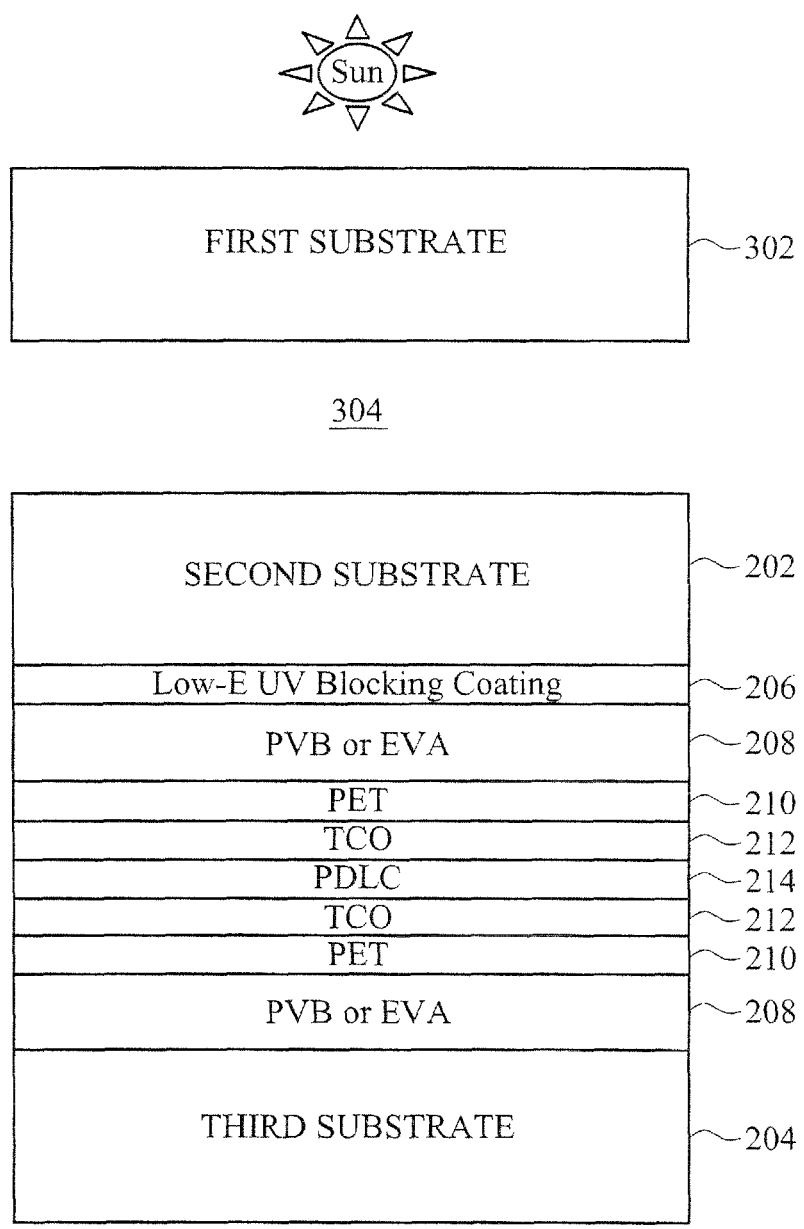
FIG. 3 is a cross-sectional view of an insulating glass (IG) window unit in accordance with an example embodiment of this invention.

FIG. 3 is a cross-sectional view of an insulating glass (IG) window unit in accordance with an example embodiment. FIG. 3 is similar to FIG. 2. For example, the same liquid crystal inclusive (e.g., PDLC) stack of a low-E UV blocking coating 206, a first laminate layer 208, a first polymer-based (e.g., PET) layer 210, a first TCO layer 212, the PDLC 214, a second TCO layer 212, a second polymer-based (e.g., PET) layer 210, and a second laminate layer 208 are provided between second and third substrates (e.g., glass substrates) 202, 204. However, as shown in FIG. 3, a first substrate 302 (e.g., glass substrate) is located proximate to the second substrate 202. The first and second substrates 302, 202 are separated, e.g., by an air gap 304, so as to provide insulating features for the IG unit. The three substrates are substantially parallel to one another.

Thus, the example embodiment shown in and described with reference to FIG. 3 may be thought of as being a conventional IG unit, with the low-E UV blocking coating conventionally found on surface 2 of the window being moved to surface 4 of the window, along with the other elements of the PDLC stack of certain example embodiments.

Also, in connection with certain of the example IG units described herein, a low-E (and/or UV or UVA blocking) layer may be provided on surface 2 of the window (e.g., on the inner surface of the first substrate 302 proximate to the air gap 304) in certain example embodiments. This low-E layer may augment or replace the low-E UV blocking coating 206 located on the inner surface of the second substrate 202, depending on the illustrative implementation chosen.

In certain example embodiments, the periphery of the stack is left open (e.g., not sealed). However, in certain other example embodiments, a seal (e.g., a polymer-based seal) may be provided around the periphery of the window and/or at least the PDLC stack, so as to reduce the amount of water, debris, etc., from entering into the unit.

Figure 4:
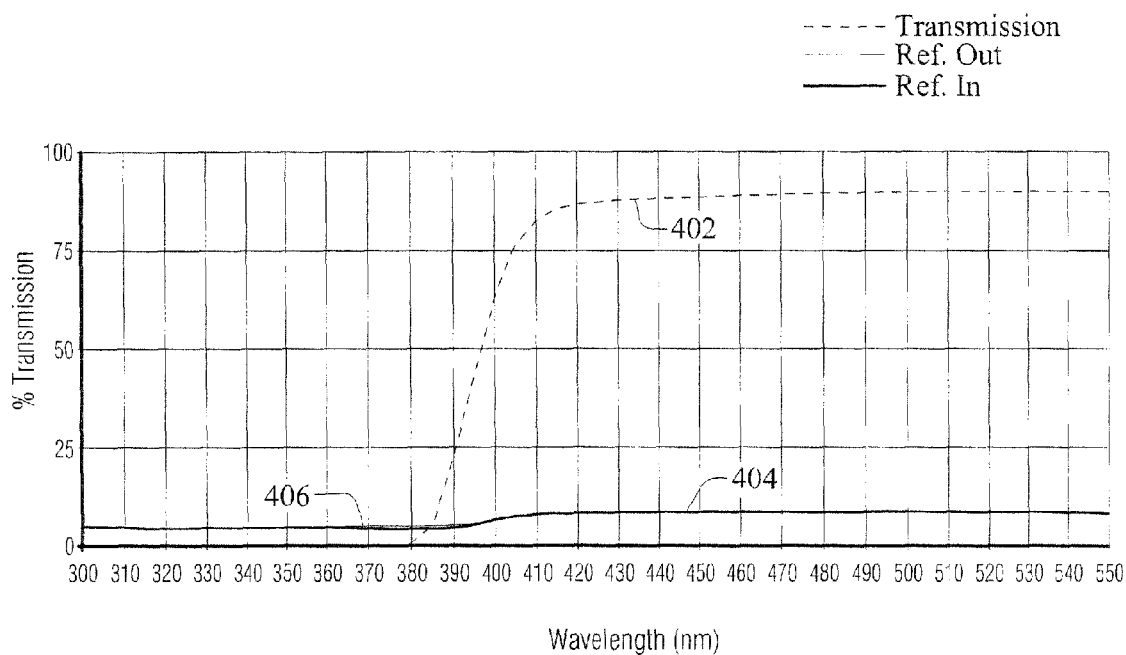
FIG. 4 is a graph of experimental data that illustrates the general ineffectiveness of the PVB in containing the UVA incidence (the vertical axis of the graph represents percent transmission, and the horizontal axis of the graph represents wavelength in nm)

FIG. 4 is a graph of experimental data that illustrates the general ineffectiveness of the PVB in containing the UVA incidence. The graph shows the transmission of visible light (Tvis) and the reflectance of visible light (Rvis) of a full laminate with clear PVB in the 300 to 500 nm range. Light having a wavelength above about 400 nm (e.g., from about 400 nm to about 700 nm) typically is visible. The sample tested was a piece of clear glass, 1.7 mm thick. In FIG. 4, line 402 corresponds to transmission of light, line 404 corresponds to inward reflection, and line 406 corresponds to outward reflection. As can be seen from FIG. 4, about 99% of UV transmission is blocked up to about 380 nm. However, the UV transmission increases markedly thereafter. The reflection in and out is very low throughout all wavelengths. Thus, as will be appreciated from FIG. 4, the PVB alone does little to block UVA incidence and provides low inward and outward reflection (also resulting in, for example, poor insulating features and leading to one or more of the above-described and/or other drawbacks).

Figure 5:
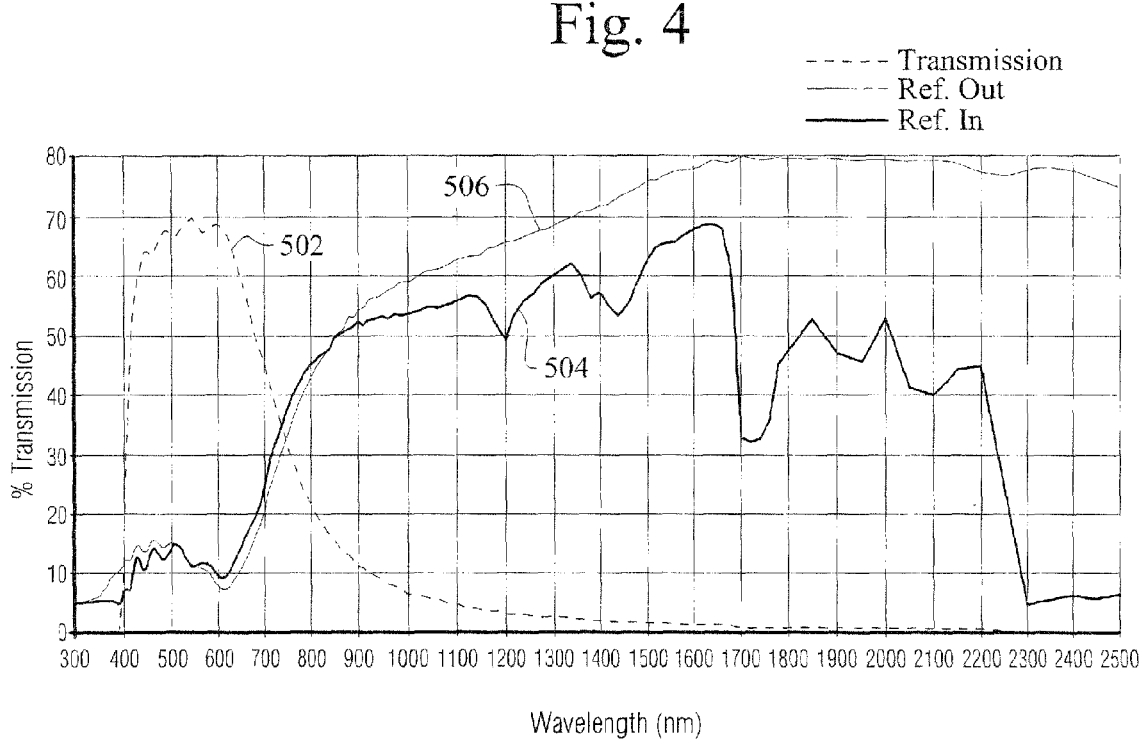
FIG. 5 is a graph of experimental data that illustrates the advantages gained by ruggedizing the PDLC in accordance with an example embodiment (the vertical axis of the graph represents percent transmission, and the horizontal axis of the graph represents wavelength in nm)

By way of contrast, FIG. 5 is a graph of experimental data that illustrates the advantages gained by ruggedizing the PDLC in accordance with an example embodiment. More particularly, Tvis and Rvis are shown for a half-laminate with a double silver low-E and UV blocking film being disposed on surface 2 of the window, in accordance with an example embodiment. The sample tested was clear glass, coated with SunGuard SN 68 and ClimaGuard SPF (both commercially available from Guardian) and incorporating a 0.030" PVB laminate layer, bringing the total thickness to about 3 mm. In FIG. 5, line 502 corresponds to transmission of light, line 504 corresponds to inward reflection, and line 506 corresponds to outward reflection. Unlike the arrangement that produced the results of FIG. 4 in which the PVB alone does not block light having a wavelength from about 380-400 nm, the arrangement of FIG. 5 and of certain example embodiments includes a low-E and UVA blocking layer that does block light having a wavelength from about 380-400 nm. There is an average of about 65%, transmission between about 400 nm and 650 nm. Tvis falls rapidly until about 900 nm, and is greatly reduced above about 1300 nm. Reflection in and out range from about 5% to about 10% in the wavelength range of about 300-600 nm, and then climb markedly starting at about 600 nm. Thus, as will be appreciated from FIG. 5, substantially more UVA incidence is blocked, and Rvis is higher at substantially all wavelengths. There is also good transmission of visible light.

The following table provides additional experimental data, showing the changes in haze, E*-value, and percent of visible transmission in various test samples from "0-hour" UV exposure over a number of different UV exposure times produced according to certain example embodiments. For example, $a^*=a^*_1-a^*_0$, with $a^*_0$ being the a* value after 0 hours of UV exposure, $b^*=b^*_1-b^*_0$, with $b^*_0$ being the b* value after 0 hours of UV exposure, $L^*=L^*_1-L^*_0$, with $L^*_0$ being the L* value after 0 hours of UV exposure, etc. As can be appreciated from the table below, the samples created in accordance with certain example embodiments held-up very well in terms of changes in haze, E*-value, and percent of visible transmission, even after over 3,000 hours of UV exposure. Unless otherwise noted, the procedure for gathering the data in the table involved measuring each sample twice in the off state. Then, each sample was measured twice in the on state after waiting approximately 4 minutes. The data provided below represents the average of the two measurements. It was discovered that on state values are cyclical and do not always stabilize.

Sample 4 provides a comparative example, in that one-half of the sample did not have a UV blocking coating, whereas the other half of the sample did have a UV blocking coating, L*, a*, and b* represent transmissive measurements.

| | | Sample 1 | | Sample 2 | | Sample 3 | | Sample 4 | | Sample 4 | |
|---|---|---|---|---|---|---|---|---|---|---|---|
| | | | | | | Type | | | | | |
| UV Time | | UV Blocker | | UV Blocker | | UV Blocker | | ½ no UV Blocker | | ½ UV Blocker | |
| | | | | | | State | | | | | |
| (hrs) | | Off | On | Off | On | Off | On | Off | On | Off | On |
| 0 | Haze | 101 | 5.95 | 102 | 6.68 | 102 | 6.94 | 102 | 7.62 | 102 | 7.62 |
| | % Tvis (Y 2/C) | 1.66 | 72.09 | 1.29 | 70.65 | 1.23 | 67.52 | 1.31 | 68.21 | 1.31 | 68.21 |
| | L* (2/C) | 13.57 | 88.01 | 11.19 | 85.77 | 10.81 | 86.11 | 11.36 | 86.11 | 11.36 | 86.11 |
| | a* (2/C) | 4.61 | −0.75 | 2.36 | −0.76 | 2.46 | −1.57 | 1.98 | −1.15 | 1.98 | −1.15 |
| | b* (2/C) | 9.17 | 5.38 | 6.44 | 5.61 | 6.52 | 8.09 | 6.13 | 4.98 | 6.13 | 4.98 |
| 336 | Haze | 101 | 5.92 | 102 | 6.80 | 102 | 7.07 | 102 | 7.22 | 102 | 7.71 |
| | % Tvis (Y 2/C) | 1.64 | 70.99 | 1.32 | 68.59 | 1.19 | 68.53 | 1.56 | 67.24 | 1.47 | 68.75 |
| | L* (2/C) | 13.48 | 87.48 | 11.40 | 86.29 | 10.47 | 86.27 | 12.97 | 85.62 | 12.38 | 86.38 |
| | a* (2/C) | 4.70 | −0.51 | 2.57 | −0.99 | 1.79 | −0.91 | 3.41 | −0.85 | 2.63 | −0.82 |
| | b* (2/C) | 9.09 | 5.26 | 6.57 | 6.90 | 5.44 | 6.63 | 8.25 | 5.45 | 6.97 | 4.43 |
| | Δ Haze | 0.0 | 0.0 | −0.5 | 0.1 | −0.5 | 0.1 | 0.0 | −0.4 | 0.0 | 0.1 |
| | Δ % Tvis (Y 2/C) | 0.0 | −1.1 | 0.0 | −2.1 | 0.0 | 1.0 | 0.3 | −1.0 | 0.2 | 0.5 |
| | ΔE* | 0.2 | 0.6 | 0.3 | 1.7 | 1.3 | 1.7 | 3.0 | 0.7 | 1.5 | 0.7 |
| 672 | Haze | 101 | 6.15 | 102 | 6.77 | 102 | 7.02 | 102 | 7.43 | 102 | 7.74 |
| | % Tvis (Y 2/C) | 1.74 | 70.50 | 1.32 | 69.44 | 1.24 | 68.87 | 1.45 | 67.11 | 1.41 | 68.72 |
| | L* (2/C) | 14.06 | 87.24 | 11.41 | 86.72 | 10.86 | 86.43 | 12.30 | 85.56 | 12.03 | 86.36 |
| | a* (2/C) | 5.07 | −0.66 | 2.63 | −0.78 | 2.04 | −0.90 | 3.14 | −0.72 | 2.56 | −0.78 |
| | b* (2/C) | 9.81 | 5.66 | 6.57 | 5.62 | 5.88 | 6.47 | 7.70 | 5.60 | 6.87 | 4.53 |
| | Δ Haze | 0.0 | 0.2 | −0.5 | 0.1 | −0.5 | 0.1 | 0.5 | −0.2 | 0.0 | 0.1 |
| | Δ % Tvis (Y 2/C) | 0.1 | −1.6 | 0.0 | −1.2 | 0.0 | 1.4 | 0.1 | −1.1 | 0.1 | 0.5 |
| | ΔE* | 0.9 | 0.8 | 0.4 | 0.6 | 0.3 | 1.9 | 2.2 | 0.9 | 1.2 | 0.6 |
| 1008 | Haze | 101 | 6.04 | 102 | 6.76 | 102 | 7.03 | 102 | 7.39 | 102 | 7.76 |
| | % Tvis (Y 2/C) | 1.74 | 69.88 | 1.30 | 68.74 | 1.24 | 67.31 | 1.42 | 66.66 | 1.39 | 68.36 |
| | L* (2/C) | 14.07 | 86.93 | 11.28 | 86.38 | 10.84 | 85.66 | 12.10 | 85.33 | 11.87 | 86.19 |
| | a* (2/C) | 5.09 | −0.78 | 2.54 | −0.98 | 2.05 | −1.33 | 3.01 | −0.74 | 2.54 | −0.76 |
| | b* (2/C) | 9.79 | 6.19 | 6.47 | 6.46 | 5.84 | 7.95 | 7.64 | 5.81 | 6.73 | 4.65 |
| | Δ Haze | 0.0 | 0.1 | −0.5 | 0.1 | −0.5 | 0.1 | 0.5 | −0.2 | 0.5 | 0.1 |
| | Δ % Tvis (Y 2/C) | 0.1 | −2.2 | 0.0 | −1.9 | 0.0 | −0.2 | 0.1 | −1.6 | 0.1 | 0.2 |
| | ΔE* | 0.9 | 1.4 | 0.2 | 1.3 | 0.3 | 0.3 | 2.0 | 1.2 | 1.0 | 0.5 |
| 1344 | Haze | 101 | 6.42 | 102 | 6.86 | 102 | 7.29 | 102 | 7.415 | 102 | 7.81 |
| | % Tvis (Y 2/C) | 1.67 | 70.47 | 1.33 | 69.06 | 1.21 | 69.62 | 1.49 | 66.28 | 1.42 | 68.16 |
| | L* (2/C) | 13.67 | 87.23 | 11.45 | 86.54 | 10.60 | 86.81 | 12.53 | 85.14 | 12.08 | 86.09 |
| | a* (2/C) | 4.66 | −0.59 | 2.79 | −0.83 | 1.87 | −0.55 | 3.42 | −0.73 | 2.74 | −0.79 |

-continued

| | | Sample 1 | | Sample 2 | | Sample 3 | | Sample 4 | | Sample 4 | |
|---|---|---|---|---|---|---|---|---|---|---|---|
| | | | | | | Type | | | | | |
| UV Time | | UV Blocker | | UV Blocker | | UV Blocker | | ½ no UV Blocker | | ½ UV Blocker | |
| | | | | | | State | | | | | |
| (hrs) | | Off | On | Off | On | Off | On | Off | On | Off | On |
| | b* (2/C) | 9.25 | 5.62 | 6.65 | 6.26 | 5.53 | 5.29 | 8.29 | 6.06 | 7.01 | 4.82 |
| | Δ Haze | 0.0 | 0.5 | −0.5 | 0.2 | −0.5 | 0.4 | 0.5 | −0.2 | 0.5 | 0.2 |
| | Δ % Tvis (Y 2/C) | 0.0 | −1.6 | 0.0 | −1.6 | 0.0 | 2.1 | 0.2 | −1.9 | 0.1 | −0.1 |
| | ΔE* | 0.1 | 0.8 | 0.5 | 1.0 | 0.6 | 3.2 | 2.8 | 1.5 | 1.4 | 0.4 |
| 1680 | Haze | 100.5 | 5.93 | 101.5 | 6.65 | 100.85 | 6.985 | 102 | 7.62 | 102 | 7.47 |
| | % Tvis (Y 2/C) | Data | 71.03 | 1.30 | 69.95 | Data | 69.85 | 1.42 | 66.00 | 1.42 | 67.33 |
| | L* (2/C) | missing | 87.50 | 11.26 | 86.98 | missing | 86.92 | 12.11 | 84.99 | 12.08 | 85.67 |
| | a* (2/C) | | −0.55 | 2.55 | −0.57 | | −0.59 | 3.07 | −0.75 | 2.75 | −0.88 |
| | b* (2/C) | | 5.45 | 6.45 | 5.58 | | 5.37 | 7.89 | 6.30 | 7.08 | 5.05 |
| | Δ Haze | −0.5 | 0.0 | −0.5 | 0.0 | −1.2 | 0.1 | 0.5 | 0.0 | 0.5 | −0.2 |
| | Δ % Tvis (Y 2/C) | | −1.1 | 0.0 | −0.7 | | 2.3 | 0.1 | −2.2 | 0.1 | −0.9 |
| | ΔE* | | 0.6 | 0.2 | 0.4 | | 3.1 | 2.2 | 1.8 | 1.4 | 0.5 |
| 2016 | Haze | 102 | 6.02 | 102 | 6.63 | 102 | 6.97 | 102 | 7.53 | 102 | 7.4 |
| | % Tvis (Y 2/C) | 1.73 | 70.53 | 1.30 | 69.77 | 1.235 | 69.93 | 1.47 | 65.47 | 1.56 | 65.49 |
| | L* (2/C) | 14.01 | 87.26 | 11.28 | 86.89 | 10.81 | 86.97 | 12.37 | 84.73 | 12.97 | 84.74 |
| | a* (2/C) | 5.10 | −0.66 | 2.60 | −0.59 | 2.125 | −0.51 | 3.14 | −0.72 | 3.39 | −1.46 |
| | b* (2/C) | 9.85 | 5.59 | 6.56 | 5.62 | 5.885 | 5.39 | 8.25 | 6.53 | 8.13 | 7.36 |
| | Δ Haze | 0.5 | 0.1 | 0.0 | 0.0 | 0.0 | 0.0 | 0.5 | −0.1 | 0.5 | −0.2 |
| | Δ % Tvis (Y 2/C) | 0.1 | −1.6 | 0.0 | −0.9 | 0.0 | 2.4 | 0.2 | −2.7 | 0.3 | −2.7 |
| | ΔE* | 0.9 | 0.8 | 0.3 | 0.5 | 0.3 | 3.1 | 2.6 | 2.1 | 2.9 | 2.8 |
| 2352 | Haze | 101 | 5.88 | 102 | 6.66 | 102 | 6.93 | 102 | 7.43 | 102 | 7.395 |
| | % Tvis (Y 2/C) | 1.71 | 71.09 | 1.32 | 69.70 | 1.23 | 69.88 | 1.48 | 65.42 | 1.48 | 65.31 |
| | L* (2/C) | 13.88 | 87.53 | 11.39 | 86.85 | 10.80 | 86.94 | 12.45 | 84.70 | 12.51 | 84.64 |
| | a* (2/C) | 5.04 | −0.55 | 2.66 | −0.61 | 2.12 | −0.54 | 3.37 | −1.37 | 3.17 | −0.81 |
| | b* (2/C) | 9.76 | 5.59 | 6.67 | 5.67 | 5.90 | 5.44 | 8.55 | 7.24 | 7.84 | 6.69 |
| | Δ Haze | 0.0 | −0.1 | 0.0 | 0.0 | 0.0 | 0.0 | 0.5 | −0.2 | 0.5 | −0.2 |
| | Δ % Tvis (Y 2/C) | 0.1 | −1.0 | 0.0 | −1.0 | 0.0 | 2.4 | 0.2 | −2.8 | 0.2 | −2.9 |
| | ΔE* | 0.8 | 0.6 | 0.4 | 0.5 | 0.3 | 3.1 | 3.0 | 2.7 | 2.4 | 2.3 |
| 2688 | Haze | 101 | 6.08 | 102 | 6.66 | 102 | 7.09 | | | | |
| | % Tvis (Y 2/C) | 1.75 | 71.00 | 1.32 | 69.75 | 1.24 | 69.64 | | | | |
| | L* (2/C) | 14.13 | 87.49 | 11.42 | 86.88 | 10.83 | 86.82 | | | | |
| | a* (2/C) | 5.23 | −0.56 | 2.69 | −0.59 | 2.15 | −0.56 | | | | |
| | b* (2/C) | 10.02 | 5.65 | 6.76 | 5.75 | 6.02 | 5.53 | | | | |
| | Δ Haze | 0.0 | 0.1 | 0.0 | 0.0 | 0.0 | 0.2 | −101.5 | −7.6 | −101.5 | −7.6 |
| | Δ % Tvis (Y 2/C) | 0.1 | −1.1 | 0.0 | −0.9 | 0.0 | 2.1 | −1.3 | −68.2 | −1.3 | −68.2 |
| | ΔE* | 1.2 | 0.6 | 0.5 | 0.5 | 0.4 | 2.9 | 13.1 | 86.3 | 13.1 | 86.3 |
| 3024 | Haze | 101 | 5.94 | 102 | 6.56 | 102 | 6.76 | | | | |
| | % Tvis (Y 2/C) | 1.815 | 68.29 | 1.35 | 69.78 | 1.27 | 69.84 | | | | |
| | L* (2/C) | 14.47 | 86.15 | 11.60 | 86.89 | 11.05 | 86.92 | | | | |
| | a* (2/C) | 5.44 | −1.13 | 2.86 | −0.58 | 2.27 | −0.55 | | | | |
| | b* (2/C) | 10.48 | 7.17 | 6.99 | 5.77 | 6.27 | 5.53 | | | | |
| | Δ Haze | −1.0 | 0.0 | 0.0 | −0.1 | 0.0 | −0.2 | −101.5 | −7.6 | −101.5 | −7.6 |
| | Δ % Tvis (Y 2/C) | 0.2 | −3.8 | 0.1 | −0.9 | 0.0 | 2.3 | −1.3 | −68.2 | −1.3 | −68.2 |
| | ΔE* | 1.8 | 2.6 | 0.8 | 0.5 | 0.4 | 3.0 | 13.1 | 86.3 | 13.1 | 86.3 |

It is noted that after turning the samples to the on state, it takes about 8 minutes for the transmission measurements to re-stabilize in the off state. This was not initially noticed on samples 1, 2, and 3. Off state measurements were taken once samples stabilized. Only one set of initial data for sample 4 was gathered; therefore, it was considered baseline data for both the panel and the UV blocked side.

It will be appreciated that it is desirable to reduce the absolute values of the changes in haze, percent visible transmission, and E* values over time, for both on and off states. Thus, it is preferable to reduce the absolute value of the change in haze to below about 10, more preferably below about 5, even more preferably below about 3, even more preferably below about 2, and most preferably below about 1. Similarly, it is preferable to reduce the absolute value of the change in Tvis (when measure with the Y 2/C method) to below about 5, even more preferably below about 3, even more preferably below about 2, and most preferably below about 1. Again, it is preferable to reduce the change in E* to below about 5, even more preferably below about 3, even more preferably below about 2, and most preferably below about 1. It will be appreciated that the exposure to UV over time may affect one or both of the on and off state measurements. Thus, it may not always be possible to achieve corresponding reductions to the changes in haze, Tvis, and E*, for both the on and off states, although it is still desirable to achieve reductions to the changes in haze, Tvis, and E*, for one of the on and off states even when it is not possible to achieve corresponding results for the other state.

As noted above, there sometimes is a problem related to delamination of curved laminates with sharp edges proximate to high-stress hot-spots. To make curved laminates, certain example embodiments take into account the stiffness of the PET material being used. For example, in certain example embodiments, to attenuate the z-component of the compressive stress below 100 MPa, the PET/LC/PET layers combined may be provided at a thickness that does not exceed about 300 microns. In addition, or in the alternative, stress points may be reduced by the use of laser cutting of the raw LC material in certain example embodiments. By way of example and without limitation, the LC may be laser cut, e.g., so as to include grooves or channels. Such grooves or channels may be located on opposing sides of the stack. In addition to reducing the delamination, these and/or similar grooves also help reduce the formation of wrinkles.

Further details of an example multi-layer low-E UV blocking coating that may be used in connection with certain example embodiments is now provided. Certain example low-E UV blocking coatings may include a layer stack that may permit the coated article to achieve one or more of high selectivity ($T_{vis}$/SF), a fairly low solar factor (SF), substantially neutral color at normal and/or off-axis viewing angles, and/or low emissivity. One, two, three, or all of these features may be achieved in different embodiments of this invention. When high selectivity ($T_{vis}$/SF) is achieved, there is provided a high ratio of visible transmission ($T_{vis}$) to solar factor (SF), which will be appreciated by those skilled in the art as being an indication of a combination of good visible transmission and good solar protection of a building and/or vehicle interior for example.

In certain example embodiments of this invention, a coated article such as an IG window unit (e.g., with two spaced apart glass substrates) realizes a high selectivity ($T_{vis}$/SF) of at least 1.75, more preferably of at least 1.80, even more preferably of at least 1.85, and sometimes at least 1.90. In certain example embodiments of this invention, coated articles realize a high selectivity value, in combination with a SF of no greater than 35.0, and more preferably a SF of no greater than 34.0, even more preferably a SF of no greater than 33.0, and most preferably a SF of no greater than 32.5 (SF, or g-value, is calculated in accordance with DIN 67507, the disclosure of which is hereby incorporated herein by reference). This permits coated articles, for example, to realize good selectivity while at the same time blocking significant undesirable radiation from reaching a building interior or the like.

In certain example embodiments of this invention, a coated article is provided which has both high selectivity and desirable coloration at both normal and off-axis viewing angles such as 45 degrees from normal. Moreover, in certain example embodiments, the coloration of the coated article does not shift by more than a predetermined amount between a normal viewing angle and an off-axis viewing angle of 45 degrees for example.

In certain example embodiments of this invention, coated articles realize a visible transmission of from about 50 to 70%, more preferably from about 55 to 65%, and most preferably from about 58 to 64% in a monolithic and/or IG unit context.

Sheet resistance ($R_s$) is indicative of emissivity or emittance. Low sheet resistance is achieved in certain example embodiments of this invention. In certain example embodiments of this invention, a coated articles realizes a sheet resistance ($R_s$) of no greater than about 3.0 ohms/square, more preferably no greater than about 2.0 ohms/square, and most preferably no greater than about 1.9 ohms/square before any optional heat treatment such as tempering. Such low sheet resistance values are indicative of low emissivity.

In certain example embodiments of this invention, the low-E coating of a coated article includes only two IR reflecting layers (e.g., only two silver or silver-based layers). While other numbers of IR reflecting layers may sometimes be provided, the use of two is preferable in certain instances in that low-emittance can be achieved and more such layers are not required thereby making coatings easier and cost effective to manufacture and less susceptible to yield problems.

In certain example embodiments of this invention, an IR reflecting layer is located between respective lower and upper contact layers, each of which contacts the IR reflecting layer. The contact layers may be made of material(s) such as an oxide of nickel-chrome ($NiCrO_x$) in certain example embodiments of this invention. In certain embodiments, the lower contact layer is of the sub-oxide type, whereas the upper contact layer is more oxided than is the lower contact layer. Surprisingly and unexpectedly, it has been found that by using a sub-oxide contact layer under and contacting the IR reflecting layer and a more oxided contact layer over the IR reflecting layer, significantly higher selectivity values and lower SF values may be achieved in combination with desirable coloration at normal and/or off-axis viewing angles. These represent significant example advantages in the art.

Figure 6:
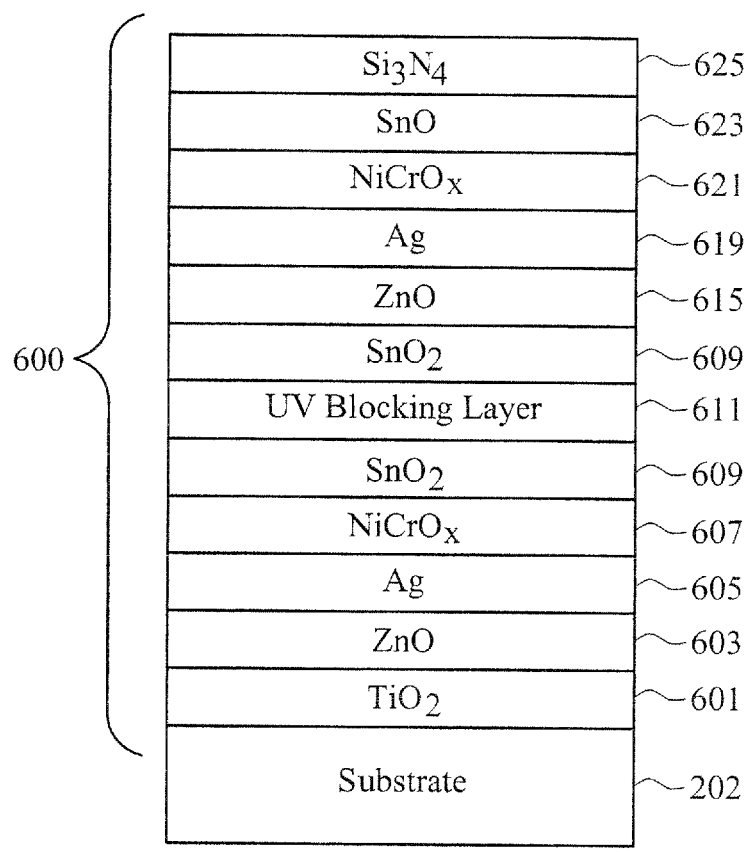
FIG. 6 is an example multi-layer low-E UV blocking coating that may be used in connection with certain example embodiments.
Figure 7:
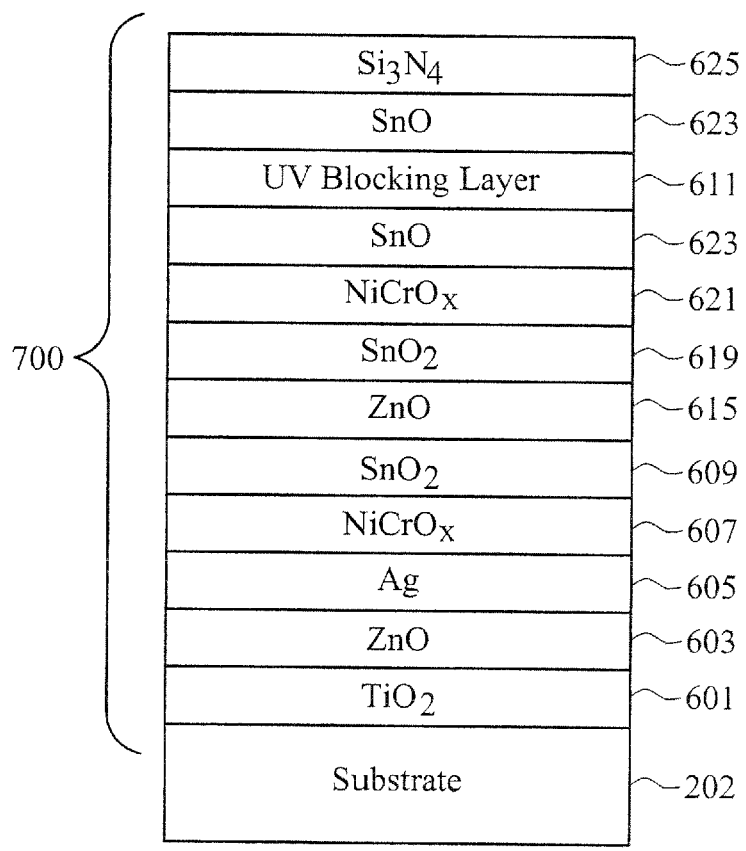
FIG. 7 is another example multi-layer low-E UV blocking coating that may be used in connection with certain example embodiments.

FIGS. 6 and 7 are example multi-layer low-E UV blocking coatings that may be used in connection with certain example embodiments. The coated article includes substrate 202 (e.g., clear, green, bronze, or blue-green glass substrate from about 1.0 to 10.0 mm thick, more preferably from about 1.0 mm to 7.0 mm thick), and coating (or layer system) 600 provided on the substrate 202 either directly or indirectly. The coating (or layer system) 600 includes: dielectric titanium oxide layer 601 which may be $TiO_x$ (e.g., where x is from 1.5 to 2.0), first lower contact layer 603 (which contacts IR reflecting layer 605), first conductive and preferably metallic infrared (IR) reflecting layer 605, first upper contact layer 607 (which contacts layer 605), dielectric layer 609 (which may be deposited in one or multiple steps in different embodiments of this invention), dielectric layer 615 may be of or include zinc oxide, second conductive and preferably metallic IR reflecting layer 619, second upper contact layer 621 (which contacts layer 619), dielectric layer 623, and finally protective dielectric layer 625. The "contact" layers 603, 607, and 621 each contact at least one IR reflecting layer (e.g., layer based on Ag, Au, or the like). The aforesaid layers 601-625 make up low-E coating 600 which is provided on glass or plastic substrate 202.

To improve the low-E coating 600 of FIG. 6 and/or the low-E coating 700 of FIG. 7 to provide enhanced UV blocking features (e.g., blockage of light having a wavelength in the range of about 380-400 nm), additional layers may be added to the stack. For example, in FIG. 6, dielectric layer 609 may be "split" and an additional UV blocking layer 611 may be added (e.g., between successive layers of the dielectric layer 609). That is, at least some of dielectric layer 609 may be deposited, the UV blocking layer 611 may be deposited, and then the rest of the dielectric layer 609 may be deposited. The UV blocking layer may be of or include zinc oxide doped with bismuth (e.g., ZnBiO or other suitable stoichiometry) or simply bismuth oxide (BiO) in certain example embodiments. In certain other example embodiments, the UV blocking layer 611 may include silver oxide (e.g., $AgO_x$ or other suitable stoichiometry), as described, for example, in U.S. Pat. No. 6,596,399, the entire contents of which is hereby incorporated herein by reference. Similarly, in FIG. 7, the dielectric layer 623 may be split and the UV blocking layer 611 may be inserted therein. In still other example embodiments, a UV blocking layer 611 surrounded by dielectric layers (e.g., of tin oxide) may be located anywhere in the low-E stack.

The improved low-E UV blocking stacks 600 and 700 thus are capable of blocking both UV and IR.

Further details of low-E coatings and stacks may be found, for example, in U.S. Pat. No. 7,198,851 or 7,189,458 or U.S. Publication No. 2005/0164015, the entire contents of each of which is hereby incorporated herein by reference. For example, dielectric layer 601 may be of or include titanium oxide in certain example embodiments of this invention. This layer is provided for anti-reflective purposes, and preferably has an index of refraction (n) of from about 2.0 to 2.6, more preferably from about 2.2 to 2.5. Layer 601 may be provided in direct contact with the glass substrate 202 in certain example embodiments of this invention, or alternatively other layer(s) may be provided between the substrate 202 and layer 601 in certain instances.

Infrared (IR) reflecting layers 605 and 619 are preferably substantially or entirely metallic and/or conductive, and may comprise or consist essentially of silver (Ag), gold, or any other suitable IR reflecting material. IR reflecting layers 605 and 619 help allow the coating to have low-E and/or good solar control characteristics. The IR reflecting layers 605 and/or 619 may, however, be slightly oxidized in certain embodiments of this invention.

Contact layers 607 and 621 may be of or include nickel (Ni) oxide, chromium/chrome (Cr) oxide, or a nickel alloy oxide such as nickel chrome oxide ($NiCrO_x$), or other suitable material(s), in certain example embodiments of this invention. The use of, for example, $NiCrO_x$ in these layers (607 and/or 621) allows durability to be improved. These contact layers may or may not be continuous in different embodiments of this invention across the entire IR reflecting layer.

In certain example embodiments of this invention, the upper contact layers 607 and/or 621 that are located above the respective IR reflecting layers 605 and 619 are deposited in a manner so as to be oxidized to a first extent. In certain example embodiments, the upper contact layers 607 and/or 621 may be substantially fully oxidized.

Surprisingly, it has been found that by using an optional sub-oxide contact layer under and contacting the IR reflecting layer 619 and a more oxidized contact layer 621 over the IR reflecting layer 619, significantly higher selectivity values and lower SF values can be achieved in combination with desirable coloration at normal and/or off-axis viewing angles. In particular, it has been found that unexpected advantages can be achieved when the optional contact layer under the IR reflecting layer 619 is deposited in a manner so as to be oxidized to a lesser extent than upper contact layer 621 on the other side of the IR reflecting layer 619. In certain example embodiments, the optional contact layer an the contact layer 621 may be composed of oxides of the same metal(s), yet be oxidized to different extents where the optional lower contact layer is oxidized to a lesser extent than is the upper contact layer 621. For example, in certain example embodiments of this invention, the optional lower $NiCrO_x$ contact layer is a sub-oxide (i.e., only partially oxidized) whereas upper $NiCrO_x$ contact layer 621 is substantially fully oxidized as deposited by sputtering or the like.

In certain example embodiments of this invention, as deposited and/or in the final product which is not thermally tempered in certain embodiments, the optional sub-oxide contact layer may have no more than about 80% of the oxygen content of the upper contact layer 621, more preferably no more than about 70% of the oxygen content of the upper contact layer 621, and most preferably no more than about 60% of the oxygen content of the upper contact layer 621. In each of these cases, as well as others, it will be appreciated that the lower contact layer 617 under the IR reflecting layer 619 is oxidized to a lesser extent than is the upper contact layer 621 located over the IR reflecting layer 619 in at least certain portions of the respective contact layers.

In order to deposit the optional sub-oxide contact layer in a manner so as to be less oxided than upper contact layer 621, even when they are oxides of the same metal(s) such as Ni and/or Cr, less oxygen gas flow per kW of sputtering power may be used in sputtering the optional layer compared to layer 621. For example, given similar or the same type of sputtering target(s) (e.g., using NiCr based targets for each layer), an oxygen gas flow of about 5 ml/kW may be used when sputtering the optional sub-oxide lower contact layer, whereas an oxygen gas flow of about 10 ml/kW may be used when sputtering substantially fully oxided upper contact layer 621 (the remainder of the gas flows may be made up of Ar or the like). In this particular example, the oxygen gas flow per kW of sputtering power for the optional sub-oxide layer is about 50% of that for the more oxided upper contact layer 621. In certain example embodiments of this invention, the oxygen gas flow per kW of sputtering power for the optional sub-oxide layer is no more than about 80% of that used for the upper more oxided contact layer 621, more preferably no more than about 70% of that used for the upper more oxided contact layer 621, and even more preferably no more than about 60% of that used for the upper more oxided contact layer 621.

In certain example embodiments of this invention, the upper contact layers 607 and 621 provided over the respective IR reflecting layers may be deposited in similar or the same manners.

Lower contact layer 603 and/or dielectric layer 615 in certain embodiments of this invention are of or include zinc oxide (e.g., ZnO). The zinc oxide of layer(s) 603, 615 may contain other materials as well such as Al (e.g., to form $ZnAlO_x$). For example, in certain example embodiments of this invention, one or more of zinc oxide layers 603, 615 may be doped with from about 1 to 10% Al, more preferably from about 1 to 5% Al, and most preferably about 2 to 4% Al. The use of zinc oxide 603 under the silver 605 allows for an excellent quality of silver to be achieved.

Dielectric layer 609 may be of or include tin oxide in certain example embodiments of this invention. However, as with other layers herein, other materials may be used in different instances. Dielectric layer 623 may be of or include tin oxide in certain example embodiments of this invention. However, layer 623 is optional and need not be provided in certain example embodiments of this invention. Dielectric layer 625, which may be an overcoat including one or more layers in certain example instances, may be of or include silicon nitride (e.g., $Si_3N_4$) or any other suitable material in certain example embodiments of this invention. Optionally, other layers may be provided above layer 625. For example, an overcoat layer of or including zirconium oxide (not shown) may be formed directly on top of the silicon nitride layer 625 in certain example embodiments of this invention. Silicon nitride layer 625 may be doped with Al or the like in certain example embodiments of this invention.

Other layer(s) below or above the illustrated coating may also be provided. Thus, while the layer system or coating is "on" or "supported by" substrate 202 (directly or indirectly), other layer(s) may be provided therebetween. Thus, for example, the coating of FIG. 6 may be considered "on" and "supported by" the substrate 202 even if other layer(s) are provided between layer 601 and substrate 202. Moreover, certain layers of the illustrated coating may be removed in certain embodiments, while others may be added between the various layers or the various layer(s) may be split With other layer(s) added between the split sections in other embodiments of this invention without departing from the overall spirit of certain embodiments of this invention. Thus, the use of the word "on" herein is not limited to being in direct contact with.

Certain example embodiments incorporate the illustrate layers described herein so that no more than about 20% of light having a wavelength of about 380-400 nm reaches the PDLC layer. Preferably, less than about 15% of light having a wavelength of about 380-400 nm reaches the PDLC layer. Still more preferably less than about 10%, and most preferably less than about 5%, of light having a wavelength of about 380-400 nm reaches the PDLC layer. Certain example embodiments incorporate the illustrate layers described herein so that the visible transmission of light is at least about 55%, more preferably at least about 60%, still more preferably at least about 65%, and most preferably at least about 70%.

PVB laminates tend to be more resistant to impact. However, in certain example instances, PVB laminates sometimes allow the LC layer to move inwards, degrading the performance and/or appearance of the overall structure. Thus, in certain example embodiments, a polymer (e.g., of an acrylic or an amide) may be provided at the periphery (e.g., proximate, although not necessarily limited, to the edges) of the PDLC film. This polymer may act as barrier, reducing migration of the PVB plasticizer, and reducing the chances of the LC being pushed inwards. Thus, certain example embodiments may include a polymer barrier proximate to the periphery of the PDLC film so as to reduce migration of the PVB and/or movement of the LC layer. It will be appreciated that although the movement of the LC inwards is a problem associated with PVB, a polymer barrier may be used in connection with other laminates.

Although certain example embodiments have been described in relation to various applications, the present invention is not limited thereto. The techniques of certain example embodiments may be applied to any glass and/or window-like application, such as, for example, vehicle windshields, sunroof's, interior and/or exterior windows, IG units, etc.

Also, the features, aspects, advantages, and example embodiments described herein may be combined to realize yet further embodiments.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A coated article including a low-E coating supported by a substrate, the low-E coating comprising:
    first and second infrared (IR) reflecting layers comprising silver and/or gold;
    at least one UV blocking layer that blocks significant amounts of UV light having a wavelength of from 380-400 nm so that no more than about 20% of light having a wavelength of from 380-400 nm passes through the low-E coating;
    wherein the UV blocking layer is disposed between the first and second IR reflecting layers, but is positioned so as to not directly contact the first and second IR reflecting layers, and
    wherein the at least one UV blocking layer is between and in contact with a first and a second tin oxide layer.

2. The coated article of claim 1, further comprising a first dielectric layer provided between the UV blocking layer and the first IR reflecting layer, and a second dielectric layer provided between the UV blocking layer and the second IR reflecting layer.

3. The coated article of claim 1, wherein the UV blocking layer comprises zinc oxide doped with bismuth.

4. The coated article of claim 1, wherein the UV blocking layer comprises bismuth oxide.

5. The coated article of claim 1, wherein no more than about 15% of light having a wavelength of from 380-400 nm passes through the low-E coating.

6. The coated article of claim 1, wherein no more than about 10% of light having a wavelength of from 380-400 nm passes through the low-E coating.

7. The coated article of claim 1, wherein a dielectric layer is disposed between the first and second IR reflecting layers, and the dielectric layer is split such that the UV blocking layer is disposed between the first and second portions of the dielectric layer.

8. The coated article of claim 1, further comprising at least one lower contact layer disposed under and contacting at least one of the IR reflecting layers, and at least one upper contact layer disposed over and contacting the at least one of the IR reflecting layers, wherein the lower contact layer is oxided to a lesser extent than the upper contact layer.

9. A coated article including a low-E coating supported by a substrate, the low-E coating comprising, moving away from the substrate:
    a first infrared (IR) reflecting layer comprising silver and/or gold;
    a dielectric layer comprising first and second portions;
    a second IR reflecting layer comprising silver and/or gold;
    wherein the dielectric layer is split such that at least one UV blocking layer that blocks significant amounts of UV light having a wavelength of from 380-400 nm so that no more than about 20% of light having a wavelength of from 380-400 nm passes through the low-E coating is disposed between the first and second portions of the dielectric layer, and wherein
    the at least one UV blocking layer is between and in contact with a first and a second tin oxide layer.

10. The coated article of claim 9, wherein the UV blocking layer comprises bismuth oxide.

11. The coated article of claim 9, wherein the UV blocking layer comprises bismuth-doped zinc oxide.

12. The coated article of claim 9, wherein the UV blocking layer comprises silver oxide.

13. A coated article including a low-E coating supported by a substrate, the low-E coating comprising:
    a first infrared (IR) reflecting layer comprising silver and/or gold;
    at least one UV blocking layer that blocks significant amounts of UV light having a wavelength of from 380-400 nm so that no more than about 20% of light having a wavelength of from 380-400 nm passes through the low-E coating;
    a lower contact layer;
    a second IR reflecting layer comprising silver and/or gold; and
    an upper contact layer, wherein the upper contact layer is more oxided than the lower contact layer;
    wherein the UV blocking layer is positioned so as to not directly contact the first and second IR reflecting layers, and
    wherein the at least one UV blocking layer is between and in contact with a first and a second tin oxide layer.

* * * * *